Jan. 28, 1930.  R. MENDOZA  1,745,107
CINEMATOGRAPHIC APPARATUS
Filed Sept. 17, 1927
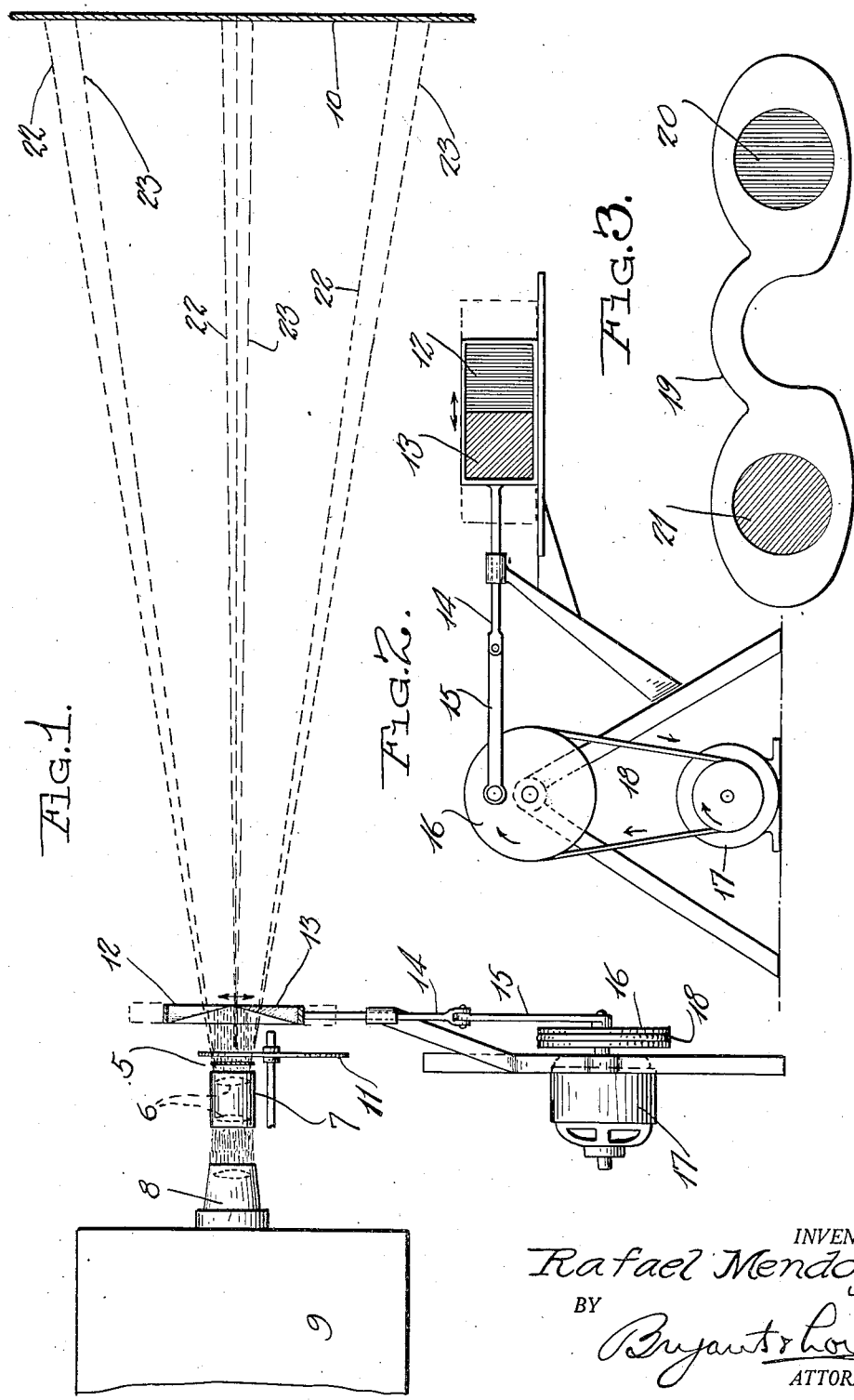
INVENTOR.
Rafael Mendoza.
BY
ATTORNEYS Patented Jan. 28, 1930

1,745,107

UNITED STATES PATENT OFFICE

RAFAEL MENDOZA, OF MEXICO, MEXICO

CINEMATOGRAPHIC APPARATUS

Application filed September 17, 1927, Serial No. 220,212, and in Mexico May 27, 1927.

This invention relates to cinematography, and has more particular reference to an improved method of and means for exhibiting animated pictures of objects in relief.

This invention consists preferably in "unfolding" the successive pictures of a film by projecting on a screen and in rapid succession a pair of differently colored images of each picture during the period of exposure of the latter, and "joining" each pair of images in the brain of the observer by permitting the images of one color to be only seen by one eye and the images of the other color to be only seen by the other eye, thereby producing the impression on the mind of the observer of seeing a single image of each picture standing out in relief.

The above "unfolding" of the pictures is effected by means of a device designed to be employed in conjunction with a kinetoscope and preferably embodying a transparent screen having a pair of successive divisions of different complementary colors, such as red and green, and means to rapidly move the screen across the path of projection, between the objective lens of the kinetoscope and the screen on which the images are projected, so that the projection of each picture will be alternately affected by the respective color divisions of the transparent screen. The "joining" of the projected pair of differently colored images of each picture is preferably effected by providing the observer with eyeglasses having lenses respectively of the red and green or complementary colors, so that with the eye looking through the red lens only the red images will be seen and with the eye looking through the green lens only the green images will be seen.

In order to insure a clear impression of the images on the mind of the observer and thereby effectively "unfold" the pictures, the images of each pair are preferably projected onto the screen in relatively laterally displaced relation. For this purpose, the color divisions of the transparent screen are preferably formed of oppositely disposed prisms so that the beam of projection is laterally refracted in one direction when one image of each picture is projected and in the other direction when the other image thereof is projected. Naturally, the degree of refraction or deflection will depend on the form of the prisms, but slight refraction will be sufficient in which the major portions of the areas of each pair of projected images will overlap the screen.

In the accompanying drawings:

Figure 1 is a somewhat diagrammatic view, partly in plan and partly in section, showing a portion of a kinetoscope and a device associated therewith for effecting the "unfolding" of pictures in accordance with the present method.

Figure 2 is a front elevation of the "unfolding" device, and

Figure 3 is an elevational view of eyeglasses for use in viewing or "joining" the images of each pair projected on the screen.

The kinetoscope may be of the usual or any preferred type in which the picture strip or film 5 is caused to travel past a window and has the light focused thereon from the lenses 6 arranged in a barrel section 7 and associated with the barrel section 8 of the light house 9. The film 5 may be transmitted through the machine by any well known form of mechanism so that it will be intermittently checked for successively projecting images of its pictures onto the screen 10 as controlled by the shutter 11.

The present invention preferably includes a transparent screen having a pair of successive divisions 12 and 13 of different complementary colors, such as red and green, and adapted to be rapidly moved across the path of projection in front of the lenses 6 so that the projection of each picture will be alternately affected by the respective color divisions of the transparent screen to cause a pair of differently colored images of each picture to be projected in rapid succession on the screen 10. As shown, the color screen is mounted to slide horizontally across the plane of projection, the same being connected at one end by a rod 14 and pitman 15 with a crank wheel 16 which is driven by a motor 17 through the medium of a belt or other gearing 18. In this way, the screen may be properly reciprocated in a horizontal direction across the plane of projection to produce the so-called "unfolding" of the pictures.

The "joining" of the projected pair of differently colored images of each picture is preferably effected by providing the observer with eyeglasses 19 having glasses or lenses 20 and 21 respectively of the red and green or complementary colors, so that with one eye looking through the red lens only the red image of each picture will be seen and with the other eye looking through the green lens only the green image of each picture will be seen. In accordance with a well known principle, when the two similar plane images are substantially simultaneously seen, one of them with one eye only and the other with the other eye only, they are "joined" in the brain and produce the impression of standing out in relief, like stereoscopic views.

In order to insure a clear impression of the images on the mind of the observer, the images of each pair are preferably projected onto the screen in relatively laterally displaced relation. For this purpose, the color divisions 12 and 13 of the transparent color screen are preferably formed of oppositely disposed prisms as shown in Figure 1, so that the beam of projection is refracted laterally in one directoin as indicated at 22 when the red image of each picture is projected and in the other direction as indicated at 23 when the green image of each picture is projected. A slight relative infraction will be sufficient in which the major portions of the areas of each pair of projected images will overlap on the screen 10 as shown.

I am aware that the method can be carried out by the use of widely different forms of means; but the means herein shown and described by way of example is what is at present deemed preferable.

What I claim as new is:

1. In a means for exhibiting animated pictures of objects in relief, a device designed to be employed in conjunction with a kinetoscope embodying a transparent screen having a pair of successive divisions of different complementary colors, and means to rapidly move the screen across the path of projection of the kinetoscope so that a pair of differently colored images of each picture of the picture strip will be projected onto a screen in rapid succession during the period of exposure of the picture, and means to cause the images of each pair to be projected onto the screen in laterally displaced relation.

2. In the means for exhibiting animated pictures of objects in relief, a device designed to be employed in conjunction with a kinetoscope embodying a transparent screen having a pair of successive divisions of different complementary colors, and means to rapidly move the screen across the path of projection of the kinetoscope so that a pair of differently colored images of each picture of the picture strip will be projected onto a screen in rapid succession during the period of exposure of the pictures, said color divisions embodying oppositely disposed prisms to cause the images of each pair to be projected onto the screen in laterally displaced relation.

In testimony whereof I affix my signature.

RAFAEL MENDOZA.